(12) United States Patent
Yonetani

(10) Patent No.: US 6,208,462 B1
(45) Date of Patent: Mar. 27, 2001

(54) CONVERSION OPTICAL SYSTEM

(75) Inventor: Atsushi Yonetani, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/156,604

(22) Filed: Sep. 18, 1998

(30) Foreign Application Priority Data

Sep. 22, 1997 (JP) ................................................ 9-256793

(51) Int. Cl.[7] ............................. G03B 13/06; G02B 21/00
(52) U.S. Cl. ......................... 359/434; 359/368; 359/381; 359/384
(58) Field of Search ................................. 359/362–363, 359/368–384, 654–660, 672, 434

(56) References Cited

U.S. PATENT DOCUMENTS

| 4,299,439 | * | 11/1981 | Stromblad | 359/384 |
|---|---|---|---|---|
| 4,365,871 | | 12/1982 | Muchel | 359/656 |
| 4,643,541 | | 2/1987 | Matsubara | 359/384 |
| 4,946,265 | * | 8/1990 | Shimizu et al. | 359/381 |
| 5,138,486 | * | 8/1992 | Meyer et al. | 359/363 |
| 5,321,447 | * | 6/1994 | Sander et al. | 359/381 |
| 5,579,156 | * | 11/1996 | Faltermeier et al. | 359/363 |
| 5,729,385 | * | 3/1998 | Nishida et al. | 359/434 |
| 5,808,791 | * | 9/1998 | Kawano et al. | 359/380 |

FOREIGN PATENT DOCUMENTS 4-124218   11/1992  (JP) .

* cited by examiner

*Primary Examiner*—Thong Nguyen
(74) *Attorney, Agent, or Firm*—Pillsbury Winthrop LLP

(57) ABSTRACT

A conversion optical system is interposed between an optical system for transmitting, at least once, an image formed by an objective lens and a final image transmitted and obtained by the optical system so that a convergent beam of light is converted into a nearly infinite optical beam.

16 Claims, 3 Drawing Sheets

CONVERSION OPTICAL SYSTEM

BACKGROUND OF THE INVENTION

1. Field of the Invention

This invention relates to a conversion optical system for using interchangeably a finite-corrected optical system with an infinity-corrected optical system, and in particular, to a variable eyepoint height type observation tube (lens-barrel) optical system to which this conversion optical system is applied.

2. Description of Related Art

Optical systems for microscopes are available in two types, one, a finite-corrected optical system forming a primary image directly through an objective lens alone, and the other, an infinity-corrected optical system designed to form the primary image by combining the objective lens with an imaging lens and to bring about a nearly infinite optical beam between the objective lens and the imaging lens. The finite-corrected optical system is characterized by its simple arrangement and compact design, while the infinity-corrected optical system has the feature that, for example, even when various optical elements are introduced into, or removed from, the nearly infinite optical beam, a double image or astigmatism is not produced. Here, the term "nearly infinite optical beam" indicates a case where light emanating from one point is rendered parallel or nearly parallel, for example, by a lens, and the term "convergent beam of light" to be employed later refers to a case where light emanating from one point forms a real image of the point, for example, through a lens.

In recent years, microscopes using infinity-corrected optical systems have become more common. At the same time, there are still many microscope systems using finite-corrected optical systems. It is therefore desirable that optical parts for use in each type of microscope be interchangable.

As an optical system for converting the convergent beam of light emerging from the objective lens of the finite-corrected optical system into the nearly infinite optical beam, a revolver lens provided in an inverted microscope is known. The inverted microscope has the mechanism that, in order to observe a culture sample, the sample is brought to a focus not by moving vertically a stage mounting the sample, but a revolver mounting the objective lens so that a cultured liquid does not spill from a culture vessel. In this type of mechanism, a lens with negative refracting power is incorporated in the revolver, and the convergent beam emerging from the objective lens of the finite-corrected optical system is converted into the nearly infinite optical beam, which is introduced into a microscope body so that an image is formed through an imaging optical system. By constructing such an optical system, even though a distance between the objective lens and the microscope body is changed, the primary image is always formed at a constant position in the microscope body. The negative lens incorporated in the revolver is the revolver lens stated above.

Japanese Patent Preliminary Publication No. Sho 55-155319 discloses an adapter system for using interchangeably the objective lens of the infinity-corrected optical system with that of the finite-corrected optical system. In particular, an adapter for using the objective lens of the finite-corrected optical system in the microscope body with the infinity-corrected optical system has the function of converting the convergent beam emerging from the objective lens of the finite-corrected optical system into the nearly infinite optical beam.

A variable eyepoint height type observation tube, however, is merely provided in accordance with each optical system in such a way that, in an up-right microscope with the finite-corrected optical system, as set forth in Japanese Patent Publication No. Hei 6-97302, an intermediate image is formed once in the midst of the transmission of an image, or in an up-right microscope with the infinity-corrected optical system, as disclosed in Japanese Utility Model Publication No. Hei 4-124218, the intermediate image is not formed.

Inverted and upright microscopes are available. Inverted microscopes having a variable eyepoint height type observation tube provide improved performance, particularly for viewing of multiple specimens in succession. Such a microscope is also convenient for viewing from a half-sitting posture. As a result, the variable eyepoint height type observation tube is desirable, but has the drawbacks that it requires a complicated mechanism and therefore is expensive. Thus, if the observation tube can be used for both an infinity-corrected optical system and a finite-corrected optical system, a considerable savings will be realized.

However, when a variable eyepoint height type observation tube for the infinity-corrected optical system commercially available is used in combination with the Inverted microscope of the finite-corrected optical system, for example, even though an attempt is made to render a nearly parallel beam emerging from the revolver lens incident directly on the variable eyepoint height type observation tube for the infinity-corrected optical system, the distance of the nearly infinite optical beam from the emergence from the revolver lens to the incidence on an imaging lens (telan lens) placed in the variable eyepoint height type observation tube becomes long and the diameter of the beam incident on the imaging lens enlarges. This leads to the problem that the effective diameter of the imaging lens is too small and the periphery of an image will be shaded.

The adapter system disclosed in Sho 55-155319, which is fixed to an objective lens barrel, has the problem that the distance of the nearly infinite optical beam from the emergence from the adapter to the incidence on the imaging lens placed in the variable eyepoint height type observation tube becomes long and thus the periphery of the image is shaded because the effective diameter of the imaging lens is insufficient.

Also, it is conceivable that the variable eyepoint height type observation tube for the up-right microscope with the finite-corrected optical system, such as that disclosed in Hei 6-97302, is applied to the inverted microscope with the finite-corrected optical system. However, since there is a limit to a mechanical tube length, the intermediate image must be formed at least once for the transmission of the image in order to provide sufficient space for a variable eyepoint height mechanism. Where the intermediate image is formed only once, it becomes an inverted image, and as a result, the inverted microscope requiring an erect image to manipulate the specimen cannot be used because its operation property is impaired. Furthermore, when the observation tube is designed so that the intermediate image is formed an even number of times, the entire observation tube becomes very bulky and thus it is hard to use.

SUMMARY OF THE INVENTION

It is, therefore, a primary object of the present invention to provide a conversion optical system in which the convergent beam of light is converted into the nearly infinite optical beam so that a microscope optical system can be constructed, without any deterioration of optical performance, not only at the center of an image but also on the periphery thereof, by combining the variable eyepoint height type observation tube for the infinity-corrected optical system with either the inverted microscope (in particular, for culture) of the finite-corrected optical system or the up-right microscope of the finite-corrected optical system.

It is another object of the present invention to provide a conversion optical system which is removably placed in the optical path and is capable of accommodating either the finite-corrected optical system or the infinity-corrected optical system.

In order to achieve the above objects, the conversion optical system according to the present invention is interposed between an optical system for transmitting, at least once, an image formed by an objective lens and a final image transmitted and obtained by this optical system so that the convergent beam of light can be converted into the nearly infinite optical beam. In this way, interchangeability between the finite-corrected optical system and the infinity-corrected optical system can be ensured.

Further, according to the present invention, the conversion optical system includes a first lens unit with negative refracting power and a second lens unit with positive refracting power which are arranged in this order from the object side. The second lens unit is placed so that its primary principal point is positioned at the exit pupil of the optical system for transmitting, at least once, the image formed by the objective lens or on the image side of the exit pupil. In this way, the second lens unit somewhat imparts convergent properties to a beam of light acquiring divergent properties which emerges from the first lens unit, and thereby the deterioration of optical performance on the periphery of the Image is obviated In such a way that the light beam emerging from the conversion optical system is not extremely spread. In other words, an image of the exit pupil of an image transmitting optical system formed by the conversion optical system is projected on the optical path excluding that between a pupil before projection (an original exit pupil of the image transmitting optical system) and the primary principal point of the second lens unit to thereby bring about a state where the diameter of the light beam is diminished.

Still further, according to the present invention, at least one of the first and second lens units includes a cemented lens. Thus, it becomes possible to eliminate considerable chromatic aberration produced by a combination of the finite-corrected optical system and the infinity-corrected optical system which is not originally assumed.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
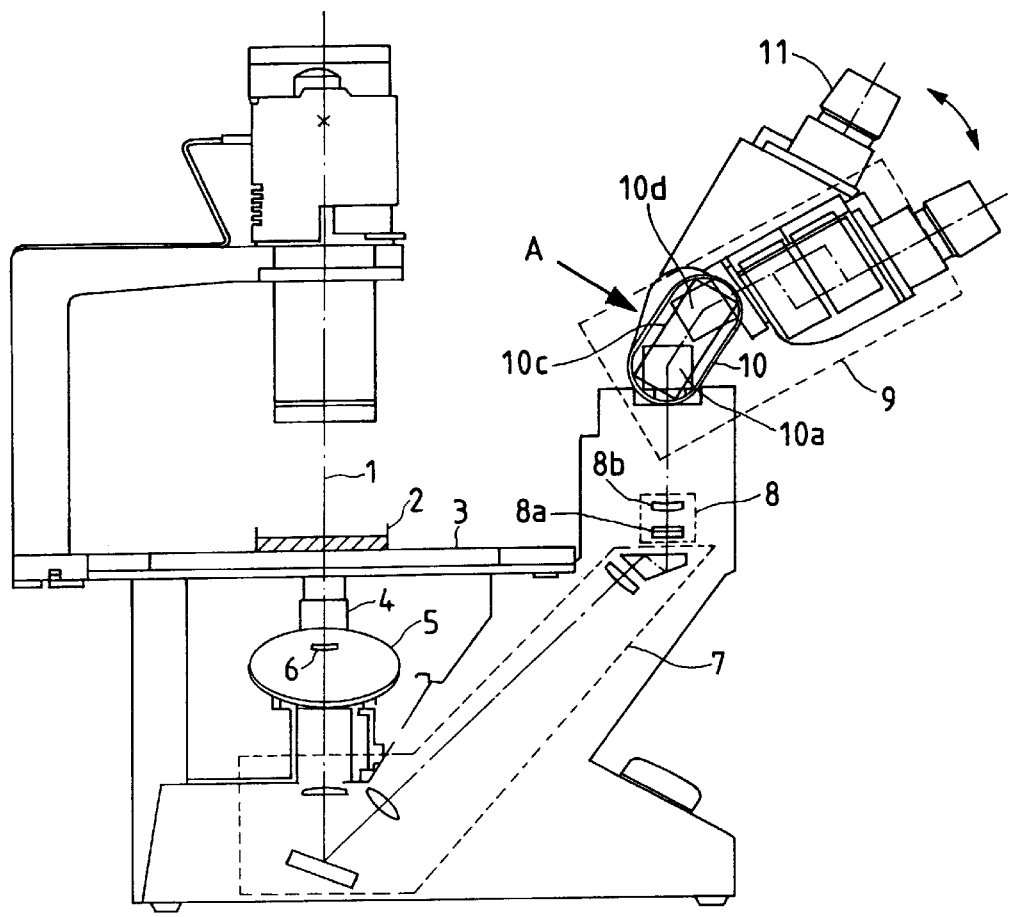
FIG. 1 is a schematic view showing the entire construction of an inverted microscope incorporating a conversion optical system according to the present invention.

In accordance with the embodiments shown in the drawings, the present invention will be explained below.

In FIG. 1, reference numeral 1 denotes an optical axis of the entire microscope optical system; 2, a culture specimen; 3, a fixed stage for mounting the culture specimen 2; 4, an objective lens for a finite-corrected optical system; 5, a revolver which is movable along the optical axis 1, integrally with the objective lens 4; and 6, a lens incorporated in the revolver 5, serving to convert a convergent beam of light emerging from the objective lens 4 into a nearly infinite optical beam so that a primary image is formed at a constant position in a microscope body even when the revolver 5 is moved along the optical axis 1 to change a distance between the objective lens 4 and the specimen 2. Reference numeral 7 represents an image transmitting optical system housed in the microscope body, forming the nearly infinite optical beam obtained by the lens 6 as the primary image at the constant position in the microscope body and transmitting this image at least once; 8, a conversion optical system according to the present invention, converting a convergent beam of light emerging from the image transmitting optical system 7 into a nearly infinite optical beam so that a variable eyepoint height type observation tube 9 for an infinity-corrected optical system can be used; 10, a moving optical system for changing the eyepoint height of the observation tube 9; and 11, an eyepiece used to magnify a final image formed in the observation tube 9 to a virtual image.

Figure 2:
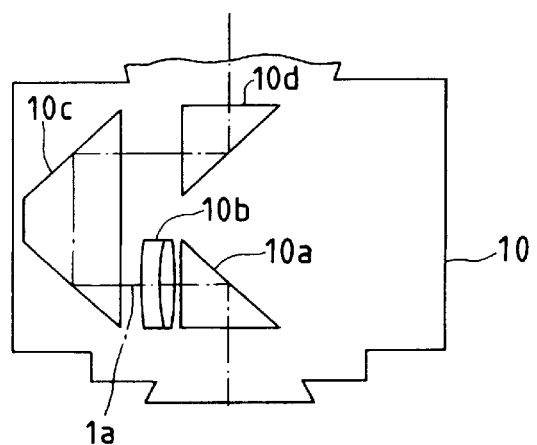
FIG. 2 is a schematic view showing the arrangement of a moving section of a variable eyepoint height type imaging-lens-housing observation tube for infinity-corrected optical systems, looking from the direction of an arrow A in FIG. 1.

The moving optical system 10, as shown in FIGS. 1 and 2, is designed so that prisms 10c and 10d and a subsequent optical system including the eyepiece 11 can be rotated around a reflection optical axis 1a, produced by a prism 10a, constituting the optical axis 1. By doing so, the eyepoint height (a height from the upper surface of a bench on which the microscope is mounted) can be changed, and it is possible for an observer to make observation in a comfortable position. Moreover, the moving optical system 10, as shown in FIGS. 2 and 3, includes an imaging lens 10b which converges the nearly infinite optical beam emerging from the conversion optical system 8 to form the final image.

Figure 4:
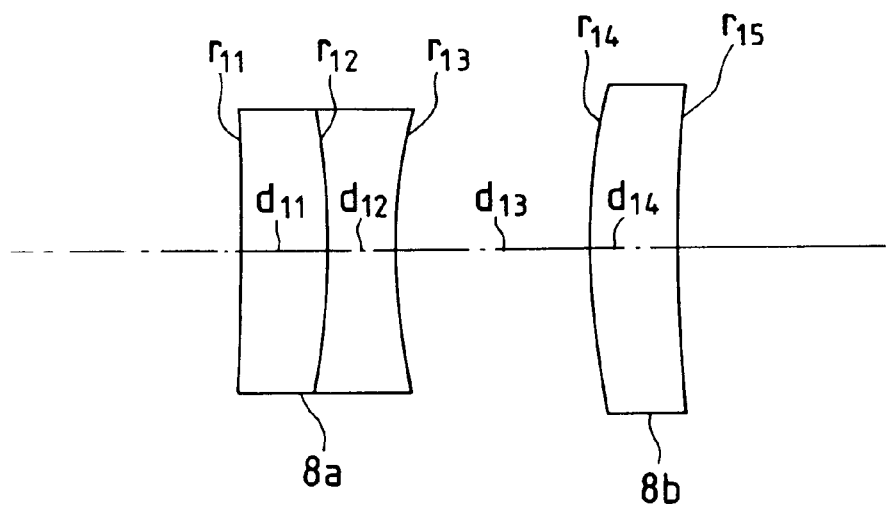
FIG. 4 is a view showing the arrangement of the conversion optical system according to the present invention.

The conversion optical system 8, as depicted in FIG. 4, is comprised of a first lens unit 8a with negative refracting power and a second lens unit 8b with positive refracting power. The first lens unit 8a is a cemented lens. This arrangement is required to hold a balance against unnecessary chromatic aberration produced at the observation tube 9 in which the combination for use in the microscope is not originally assumed. Thus, since the balance against chromatic aberration varies with the type of the imaging lens, a cemented lens may be included in the second lens unit 8b or in each of the first and second lens units 8a and 8b.

Figure 3:
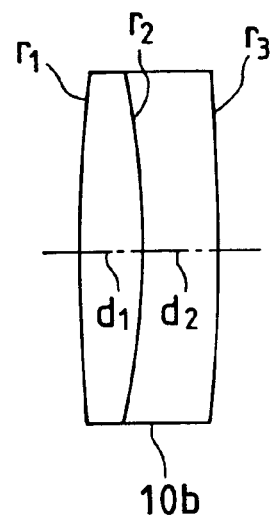
FIG. 3 is a view showing the construction of an imaging lens of the variable eyepoint height type imaging-lens-housing observation tube for infinity-corrected optical systems.

With reference to FIGS. 3 and 4, numerical data of the imaging lens 10b and the first and second lens units 8a and 8b of the conversion optical system 8 in this embodiment are shown below.

| | | | |
|---|---|---|---|
| $r_1 = 142.2865$ | | | |
| | $d_1 = 3.6215$ | $nd_1 = 1.48749$ | $vd_1 = 70.21$ |
| $r_2 = -62.7782$ | | | |
| | $d_2 = 4.5828$ | $nd_2 = 1.74950$ | $vd_2 = 35.27$ |
| $r_3 = -123.3704$ | | | |
| $r_{11} = -205.0413$ | | | |
| | $d_{11} = 5.0033$ | $nd_{11} = 1.60562$ | $vd_{11} = 43.70$ |
| $r_{12} = -54.8436$ | | | |
| | $d_{12} = 3.9953$ | $nd_{12} = 1.48749$ | $vd_{12} = 70.23$ |
| $r_{13} = 46.0404$ | | | |
| | $d_{13} = 11.2511$ | | |
| $r_{14} = 53.1927$ | | | |
| | $d_{14} = 5.0024$ | $nd_{14} = 1.60311$ | $vd_{14} = 60.64$ |
| $r_{15} = 103.0630$ | | | |

Here, it is assumed that the object point regarding the conversion optical system 8 is located 179.5846 mm from the lens surface labeled $r_{11}$ on the final image side thereof.

The second lens unit 8b of the conversion optical system 8 is constructed so that its primary principal point is situated at the position of the exit pupil of the image transmitting optical system 7 or on the image side of the exit pupil, and by somewhat imparting convergent properties to a beam of light acquiring divergent properties which emerges from the first lens unit 8a, the periphery of the final image is not shaded in such a way that the light beam is not extremely spread before it is incident on the imaging lens 10b. In this embodiment, an exit pupil EXPo of the image transmitting optical system 7 is located on the specimen side 28.0090 mm from the surface lying on the specimen side (the surface labeled $r_{14}$ in FIG. 4) of the second lens unit 8b. This exit pupil EXPo is projected on the specimen side 35.0939 mm from the surface on the image side (the surface labeled $r_{15}$ in FIG. 4) of the second lens unit 8b (namely, 30.0915 mm from the surface of $r_{14}$). Also, symbol EXPo' in FIG. 4 denotes the position of the pupil after projection. In this way, the exit pupil before or after being projected by the second lens unit 8b is located, in either case, on the specimen side of the second lens unit 8b, and the exit pupil after projection is located closer to the specimen than that before projection. As such, the second lens unit 8b imparts convergent properties to the light beam acquiring divergent properties which leaves the first lens units 8a, and thereby the light beam can be prevented from spreading before it enters the imaging lens 10b. However, the light beam passing through the first and second lens units 8a and 8b will, upon emerging from the conversion optical system 8, be changed to the nearly infinite optical beam. Since it is only necessary that the exit pupil after projection is not projected between the position of the exit pupil before projection and the position of the primary principal point of the second lens unit 8b (exclusive of both positions), the exit pupil may be projected, for example, on the image side of the primary principal point of the second lens unit 8b.

By doing so, as the light beam, after emerging from the image transmitting optical system 7, passes through the conversion optical system 8 and Is incident on the imaging lens 10b, the Intermediate Image is not formed, and hence there is no problem that an inverted Image is formed to deteriorate the manipulation of the specimen. If the conversion optical system 8 is a magnifying system, a real field view will be narrowed, while if it is a demagnifying system, an image magnified by the objective lens will be demagnified. Furthermore, If this optical system has a compromise value of magnification, the total magnification of the entire microscope also becomes a compromise. These cases are unfavorable. It is thus desirable that the magnification of an optical system combining the conversion optical system 8 with the observation tube optical system 9 is about 1×. In the embodiment, such a combined optical system has a magnification of 1×.

As will be obvious from the above explanation, the conversion optical system 8 is not originally included in the inverted microscope, and thus only the observation tube for the finite-corrected optical system can be used. However, by incorporating the conversion optical system 8 therein, the variable eyepoint height type observation tube 9 for the infinity-corrected optical system can be used in common, irrespective of a difference between the optical systems (the finite-corrected optical system and the infinity-corrected optical system) or a difference in type between the microscopes (the inverted microscope and the upright microscope). Also, since the light emerging from the conversion optical system is converted into the nearly infinite optical beam, various units can be arranged in such a way that this nearly infinite optical beam is utilized and thereby an intermediate variable magnification unit is placed so that the magnification can be changed, an empty observation tube devoid of optical systems is placed to make a fine adjustment of the eyepoint, or a reflecting projection tube is placed. Furthermore, for example, a prism which is generally high in cost can be used in common, so that a user's load is reduced by cutting development costs and the lineups of products can be increased.

Figure 5:
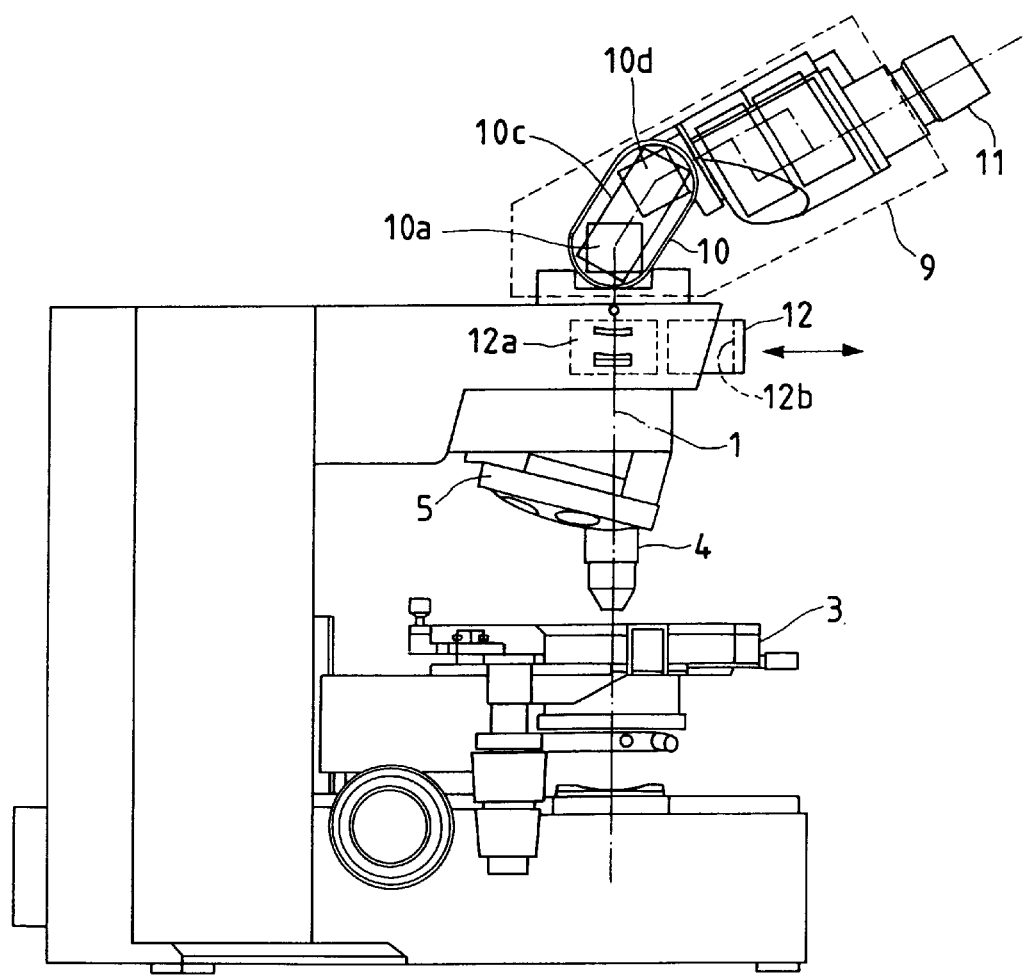
FIG. 5 is a schematic view showing the entire construction of an upright microscope incorporating the conversion optical system according to the present invention.

In FIG. 5, like numerals indicate like members with respect to the above embodiment. In another embodiment applied to the upright microscope shown in this figure, a slider unit 12 provided with a conversion optical system 12a having the same lens data as those already mentioned and a cavity part 12b are mounted to the microscope body to be slidable in a direction perpendicular to the optical axis 1. By moving the slider unit 12 in the direction of a double-headed arrow, the conversion optical system 12a can be inserted into, or removed from, the optical axis 1.

Where the conversion optical system 12a is inserted into the optical axis 1, the objective lens 4 for the finite-corrected optical system commercially available can be used in combination with the variable eyepoint height type imaging-lens-housing observation tube 9 for the infinity-corrected optical system. Where the cavity part 12b is placed on the optical axis 1, the observation tube 9 is replaced with an observation tube for the finite-corrected optical system, not shown, and thereby the upright microscope can be used as an ordinary microscope for the finite-corrected optical system. Specifically, the slider unit 12 is used so that the conversion optical system 12a is movable in and out of the optical axis, and thereby the microscope is capable of accommodating either the infinity-corrected optical system or the finite-corrected optical system.

Also, even with the optical system where the conversion optical system 12a is inserted in the optical axis 1, the light beam emerging from the image transmitting optical system is incident on the imaging lens 10b without forming the intermediate image, and thus the inverted image is not formed. It is desirable that the combined optical system of the conversion optical system 12a and the optical system in the observation tube 9 has a magnification of about 1×.

Also, in the numerical data of the embodiment mentioned above, $r_1, r_2, \ldots$ represent radii of curvature of individual lens surfaces; $d_1, d_2, \ldots$ represent thicknesses of individual lenses, or spaces therebetween; $nd_1, nd_2, \ldots$ represent refractive indices of individual lenses; and $vd_1, vd_2, \ldots$ represent Abbe's numbers of individual lenses.

What is claimed is:

1. A conversion optical system interposed between an image transmitting optical system and an image transmitted by said image transmitting optical system so that a convergent beam of light emergent from said image transmitting optical system is converted into a nearly infinite optical beam, wherein said image transmitting optical system receives light from an objective lens to form an intermediate image and transmits, at least once, the intermediate image.

2. A conversion optical system according to claim 1, wherein said conversion optical system comprises, in order from an object side,
   a first lens unit having a negative refracting power, and a second lens unit having a positive refracting power,
   wherein said conversion optical system is configured such that a position of an image of an exit pupil of said image transmitting optical system after being projected by said second lens unit, a position of the exit pupil of said image transmitting optical system before projection by the second lens unit, and said conversion optical system are arranged in this order from the object side.

3. A conversion optical system according to claim 2, wherein at least one of said first lens unit and said second lens unit includes a cemented lens.

4. A microscope optical system comprising, in order from an object side:
   an objective lens constructed and arranged in a microscope body;
   a conversion optical system which is mountable to said microscope body; and
   an observation tube optical system which is constructed separately from said microscope body, said observation tube optical system comprising an imaging lens for imaging a nearly infinite optical beam,
   wherein said conversion optical system and said observation tube optical system are constructed to be removably mounted to said microscope body, and said conversion optical system is moveable in and out of an optical path and said conversion optical system and said observation tube optical system are used in common.

5. A microscope optical system according to claim 4, further comprising:
   an image transmitting optical system which receives light from said objective lens to form an intermediate image and transmits, at least once, the intermediate image,
   wherein said conversion optical system is interposed between said image transmitting optical system and an image transmitted by said microscope optical system so that a convergent beam of light emergent from said image transmitting optical system is converted into a nearly infinite optical beam.

6. A microscope optical system according to claim 5, wherein said conversation optical system comprises, in order form an object side:
   a first lens unit having a negative refracting power; and
   a second lens unit having a positive refracting power,
   wherein said conversion optical system is configured such that a position of an image of an exit pupil of said image transmitting optical system after being projected by said second lens unit, a position of the exit pupil of said image transmitting optical system before projection by the second lens unit, and said conversion optical system are arranged in this order from the object side.

7. A microscope optical system according to claim 6, wherein said conversion optical system is constructed so that at least one of said first lens unit and said second lens unit includes a cemented lens.

8. A microscope optical system according to claim 6, wherein when said conversion optical system is placed in the optical path, a combined optical system of said conversion optical system and said observation tube optical system has a magnification of nearly 1×.

9. A microscope optical system according to claim 6, wherein when said conversation optical system is placed in the optical path, formation of an intermediate image is prevented in each of said conversion optical system and said observation tube optical system.

10. A microscope optical system according to claim 5, wherein said observation tube optical system is a variable eyepoint height type observation tube optical system.

11. A microscope optical system according to claim 4, wherein said conversion optical system comprises, in order from an object side:
    a first lens unit with negative refracting power; and
    wherein said conversion optical system is configured such that a position of an image of an exit pupil of said image transmitting optical system after being projected by said second lens unit, a position of the exit pupil of said image transmitting optical system before projection by the second lens unit, and said conversion optical system are arranged in this order from the object side.

12. A microscope optical system according to claim 11, wherein when said conversion optical system is placed in the optical path, a combined optical system of said conversion optical system and said observation tube optical system used in combination with said imaging lens has a magnification of about 1×.

13. A microscope optical system according to claim 11, wherein when said conversion optical system is placed in the optical path, formation of an intermediate image is prevented in each of said conversion optical system and said observation tube optical system used in combination with said imaging lens.

14. A microscope optical system according to claim 11, wherein said observation tube optical system is a variable eyepoint height observation tube optical system.

15. A conversion optical system applied to a microscope, comprising, in order from an object side;
    a first lens unit with negative refracting power; and
    a second lens unit with positive refracting power,
    wherein said microscope comprises:
      a microscope body provided with an objective lens and being constructed to allow said conversion optical system to mount on said microscope body; and
      an observation tube provided with an imaging lens,
    wherein said conversation optical system is adapted to be inserted between said microscope body and said observation tube in a convergent beam of light emergent from said microscope body, to converge the convergent beam of light into a substantially parallel beam.

16. A conversion optical system according to claim 15, wherein at least one of said first lens unit and said second lens unit includes a cemented lens.

* * * * *

UNITED STATES PATENT AND TRADEMARK OFFICE
CERTIFICATE OF CORRECTION

PATENT NO.    : 6,208,462 B1
DATED         : March 27, 2001
INVENTOR(S)   : Yonetani It is certified that error appears in the above-identified patent and that said Letters Patent is hereby corrected as shown below:

<u>Column 8,</u>
Lines 20-31, claim 11 should read :

11.    A microscope optical system according to claim 4, wherein said conversion optical system comprises, in order from an object side:
    a first lens unit with negative refracting power; and
    a second lens unit with positive refracting power,
    wherein said conversion optical system is configured such that a position of an image of an exit pupil of said image transmitting optical system after being projected by said second lens unit, a position of the exit pupil of said image transmitting optical system before projection by the second lens unit, and said conversion optical system are arranged in this order from the object side.

Signed and Sealed this

Sixth Day of May, 2003

JAMES E. ROGAN
*Director of the United States Patent and Trademark Office*